United States Patent [19]

Knoll

[11] Patent Number: 4,997,387

[45] Date of Patent: Mar. 5, 1991

[54] MAIN DISTRIBUTING STRIP FOR INCOMING AND OUTGOING ELECTRICAL LINES

[75] Inventor: Rudolf Knoll, Berg, Fed. Rep. of Germany

[73] Assignee: Siemens Aktiengesellschaft, Berlin and Munich, Fed. Rep. of Germany

[21] Appl. No.: 534,512

[22] Filed: Jun. 7, 1990

[30] Foreign Application Priority Data

Jun. 15, 1989 [DE] Fed. Rep. of Germany ....... 3919622

[51] Int. Cl.⁵ .............................................. H01R 4/24
[52] U.S. Cl. .................................................... 439/402
[58] Field of Search ................................ 439/389–425

[56] References Cited

U.S. PATENT DOCUMENTS 3,761,866  9/1973  Sedlacek ............................. 439/402
3,761,868  9/1973  Krone et al. ........................ 439/402

Primary Examiner—Joseph H. McGlynn
Attorney, Agent, or Firm—Hill, Van Santen, Steadman & Simpson

[57] ABSTRACT

Insulation-opening contact sections of contacts for incoming lines exit at one long side of a main distributing strip while insulation-opening contact sections of other contacts for the outgoing lines exit an opposite long side of the main distributing strip. The end sections of the contacts comprise contact poles for producing a separable electrical connection. A channel-like wiring space is limited at the inside by a long side of the main distributing strip. A transverse web extending to the long side divides the wiring space into a wiring space for the service side and a wiring space for the system side.

20 Claims, 3 Drawing Sheets

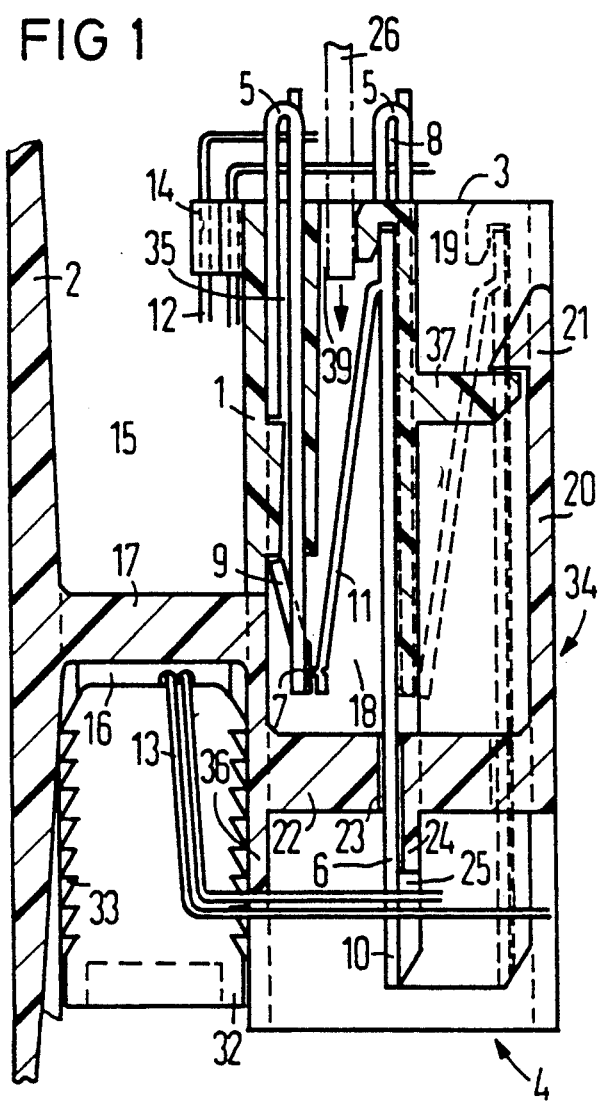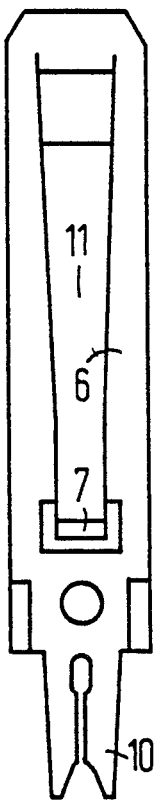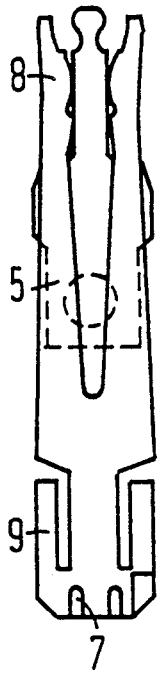

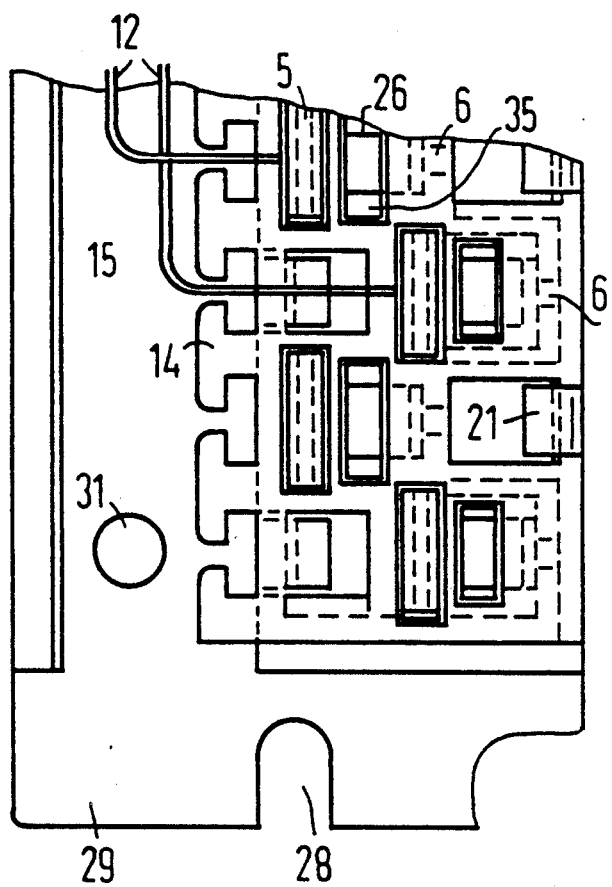
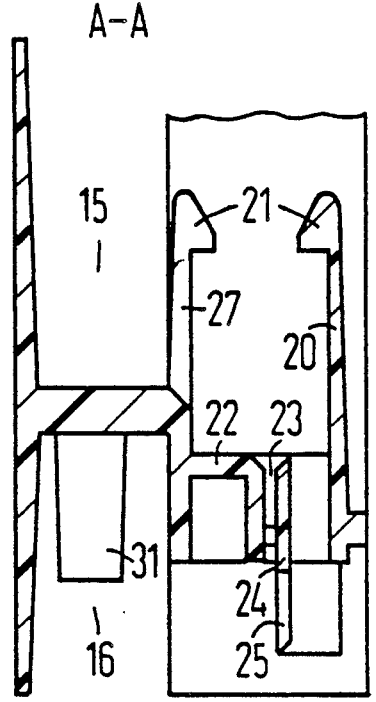
FIG 2
FIG 7
A-A

MAIN DISTRIBUTING STRIP FOR INCOMING AND OUTGOING ELECTRICAL LINES

BACKGROUND OF THE INVENTION

1. Field of the Invention

The present invention relates to a main distributing strip for incoming and outgoing electrical lines, and in particular is concerned with a main distributing strip for a telecommunication system.

2. Description of the Prior Art

Main distributing strips are generally composed of a contact housing part and of a sub-housing connected therewith for the connection of incoming and outgoing line leads in a telecommunication system, particularly in a private branch exchange system with the assistance of contacts arranged adjacently in pairs and in at least one row and held in corresponding receptacle chambers of the contact part housing, each of the contacts having their one end region fashioned to a clamp element respectively serving for insulation-free clamped connection of the line leads, and contact poles at their other end region that are resiliently fashioned for at least one of the contact components assigned to one another, the contact poles effecting a separable electrical connection together with the contact pole of the neighboring contact allocated thereto.

In such a main distributing strip having a plurality of terminal clamp elements that allow the insulation-piercing or insulation-disrupting connection of electrical conductors, the terminal clamp elements extend in the same direction. Approximately the entire width of such a main distributing strip is respectively required for the arrangement of the contact components belonging to one another in pairs, including the separating location line therebetween. Upon utilization of guide eyelets, the line leads to be connected are guided on the outside at both sides along the longitudinal limiting surfaces. When such strips are mounted in rows at a mounting rack with their long sides side-by-side, then an optimally-small distance therebetween is usually selected in order to be able to attach the greatest possible plurality of such strips. In such a case, the manual wiring jobs that are necessary are made considerably more difficult due to these tight conditions.

SUMMARY OF THE INVENTION

The object of the present invention, therefore, is to fashion the main distributing strips utilized in the communication system such that the space provided in the mounting rack is optimally utilized insofar as possible and such that the individual terminal elements are easily accessible for wiring changes. For a main distributing strip of the type initially set forth, this is achieved in that, with reference to each pair of contact components, the clamp element of the one contact component is conducted out of the contact part housing at an upper long side of the main distributing strip and the clamp element of the allocated, other contact component is conducted out of the contact part housing at a lower long side of the main distributing strip, in that a channel-like, interior wiring space is limited by one of the remaining long sides of the main distributing strip as a consequence of the shaping of at least one of the housings, the wiring space being divided by a web extending transversely relative to the long side into a first wiring space opened toward the upper long side and allocated to the terminal clamp elements conducted out at that location and into a second wiring space open toward the lower long side and allocated to the terminal clamp elements conducted out at that location.

Compared to known structures, the space required for the attachment of the contact components is reduced by this specific feature of the invention of conducting the terminal clamp elements out at the one long side and at the opposite long side, particularly since such an arrangement also allows an especially simple fashioning of the contact components that require only a slight distance from one another. That part of the width dimension of such a strip needed for the arrangement of the contacts can be reduced to such an extent that, including the feature of the invention concerning the created wiring space at the inside, the overall width has, at most, the same width as a known main distributing strip already employed given the same plurality of compact components. Since the interior wiring spaces allow the distributing strips constructed in accordance with the present invention to be strung very tightly together in immediate proximity, the number of strips to be accommodated in a defined overall length can be increased. The space respectively available is therefore maximally utilized, both with respect to the size of the mounting racks and with respect to the individual strips. The wiring spaces provided at the long sides according to the present invention are essentially formed by the shaping of the sub-housing whose lateral limiting region is fashioned to be a T-shaped region.

For example, the lines leading to the subscribers that must be frequently changed can be connected to the upper side that is to be considered as the servicing side. This is thus easily accessible, so that necessary changes in the occupation of the strip can be undertaken without problems. The clamp elements for the lines of the system side, i.e. to the switching equipment, that are usually seldom changed are, according to the present invention, arranged at the rear side of the strip. Due to this differing frequency of anticipated changes, the individual clamp elements conducted out at the service side and at the rear side are shaped differently with respect to their structural format, their design and arrangement in accordance with a particular feature of the invention.

According to particular features of the invention, the main distributing strip is particularly characterized in that the contact components allocated to one another in pairs are respectively differently fashioned with respect to their structural format and, potentially, in view of the plurality of line leads to be connected therewith, and is particularly characterized in that the end region of the one contact component serving the purpose of a clamped connection is suitable for a multiple separation and repeated production of a clamped connection and, potentially, for the clamped connection of at least two line leads, and in that the end region of the other contact component that serves for the clamped connection has a more simple structural format compared to the former contact component, the main distributing strip being further particularly characterized in that the one contact of a contact component is constructed as a double contact element and that the other contact component is constructed as a single contact element, the main distributing strip being further characterized in that the contact components are conducted out of the contact part housing only at the upper long side of the main distributing strip and the clamp elements of the contact components are conducted out of the contact part housing only at the opposite, lower long side of the main distributing strip.

According to other features of the invention, the main distributing strip is particularly characterized in that the side at which the clamp elements are conducted out represents the jumpering side, and in that the line leads of the system side that are seldom changed are connected to the single clamp elements conducted out of the opposite side. The main distributing strip is further characterized in that the end regions fashioned as clamp elements in the contact components allocated to one another in pairs differ in terms of their thickness dimension, in that an outwardly-directed guide web is respectively provided at the exit opening of the thinner clamp element which presses directly against the guide web which is dimensioned such that it supplements the thinner clamp element to the thickness of the clamp element of the respective other contact element. The main distributing strip is further characterized in that a slot that enables the line wire to be press into the clamp element is provided in the guide web.

The above features result in the advantage that a considerable cost saving results in comparison to an exclusive employment of the contact components provided at the service side when the clamp elements at the system side are fashioned significantly more simple. This results in a cost reduction with respect to the manufacture as well as with respect to assembly, this having a significant influence, particularly given the high item numbers with which these components are employed.

In conjunction with this different fashioning, the clamp elements conducted out as what is referred to as the service side and the clamp elements conducted out at the rear side differ in terms of their thickness dimension. An outwardly-directed guide web against which the contact element executed of simple band material presses is, according to the present invention, provided at the exit opening of the thinner clamp elements conducted out at the rear side. Due to the guide web, the thinner clamp element has its thickness supplemented to match the thickness of the clamp element conducted out at the other side. The significant advantage thereby results that one and the same tool can be employed for pressing the wires in.

According to particular features of the invention, a main distributing strip is particularly characterized in that the contact components held in the contact part housing together form an appropriately Z-shaped arrangement in that the one contact component extends essentially on a straight line and the other contact component is bent back onto itself at an arcuate angle, in that the end of the contact component that is not conducted out of the contact part housing comprises a contact pole that comes into contact with the contact pole present at the bent back end of the other contact component and forms the separable contact location for the voltaic connection to one another.

According to another feature of the invention, the main distributing strip is particularly characterized in that the contact components respectively forming one pair of contact components are held at the contact part housing such that approximately parallel legs of the Z-shaped arrangement are aligned approximately parallel to the long-side limiting surfaces of the main distributing strip and their ends comprising the clamp elements are conducted out of the contact part housing approximately perpendicularly to the upper or, respectively, lower long side of the main distributing strip.

According to another feature of the invention, the main distributing strip is particularly characterized in that the contact components are respectively fashioned of one piece.

According to another feature of the invention, the main distributing strip is particularly characterized in that an arrangement that enables the strain relief and the fixing of the lead lines is provided at least for the leads conducted in a channel-like wiring space.

As a result of the above features concerning the fashioning and the arrangement of the contact components, only an extremely narrow region for their integration or assembly and mounting is required. Thus, in accordance with a feature and development of the invention, an arrangement that enables a strain relief is provided in at least one of the channel-like wiring spaces for the line leads to be conducted therein. For example, this can occur by employing a pressure member that is pressed between the lateral limiting surfaces in a narrow region of the lateral limiting surfaces. In order to enable a reliable positional fixing of this pressure member, the appertaining regions of the channel walls include teeth. When this strain relief is provided for the lines at the system side, then a corresponding pre-wiring can be undertaken for the final attachment of the distributing strip to a corresponding mounting rack, since the cable having a cable plug at the other free end can be fixed in a simple manner by way of the arrangement for strain relief provided in accordance with the present invention.

According to another feature of the invention, the main distributing strip is particularly characterized in that, as mentioned above, an arrangement is fashioned as a pressure member, in that a sub-region of the sidewalls of the channel-like wiring frame provided for the attachment of the pressure member has teeth present thereat.

According to another feature of the invention, the main distributing strip is particularly characterized in that, with reference to a first row of contact components allocated to one another in pairs, the one contact component of each pair is arranged in the immediate proximity of the one long-sided limitation of a contact part housing, that at least one more second row of contact components allocated to one another in pairs is present and is arranged inwardly offset compared to the first row in an alternating fashion such that contact components of each row are attached approximately in alignment with one another.

According to another feature of the invention, the main distributor strip is particularly characterized in that an appropriate bottom surface is formed with a web at the sub-housing for seating the contact part housing, in that catch elements joined of one piece to the longitudinal limiting edge of the web are provided proximate to the longitudinal limiting edge of the web, the catch elements engaging into corresponding cooperative members after the attachment of the contact part housing for the mechanical connection between the contact part housing and the sub-housing, and in that the bottom surface comprises openings for the contact components conducted out at the appertaining long side of the contact part housing.

According to another feature of the invention, the main distributing strip is particularly characterized in that the catch elements are fashioned as catch hooks that are multiply provided at the lateral limiting edges of the web belonging to the sub-housing, in that the catch hooks have a resilient catch nose that engages behind a corresponding shoulder of the contact part housing after the contact part housing has been attached.

According to another feature of the invention, the main distributing strip is particularly characterized in that one row of catch hooks form a part of the outer surface of the main distributing strip, and in that the catch hooks of another row form the inside termination of at least the one channel-like wiring space.

According to another feature of the invention, the main distributing strip is particularly characterized in that the contact part housing comprises strip-like wall portions in the region of the inner spaces between the catch hooks so that, after the locking of the attached contact part housing to the sub-housing, limiting surfaces arise of which one co-forms a part of the outer surface of the distributing strip and the other co-forms the inner limiting surface of at least one channel-like wiring space.

According to another feature of the invention, the main distributing strip is particularly characterized in that a guide tappet for a screw connection that extends into at least one wiring space is provided at a transverse web that separates the two channel-like wiring spaces, and in that rated break points that serve the purpose of simple removal of the guide tappet, as needed, are present at the point of connection thereof to the transverse web.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a cross sectional view through a main distributing strip constructed in accordance with the present invention;

FIG. 2 is a fragmentary plan view of the main distributing strip of FIG. 1;

FIG. 3 is a side view of one contact of the type employed in the distributing strip of FIG. 1;

FIG. 4 is a side view of another type of contact employed in the distributing strip of FIG. 1;

FIG. 7 is a sectional view of the sub-housing taken generally along the parting line A—A of FIG. 5.

DESCRIPTION OF THE PREFERRED EMBODIMENTS

Figure 5:
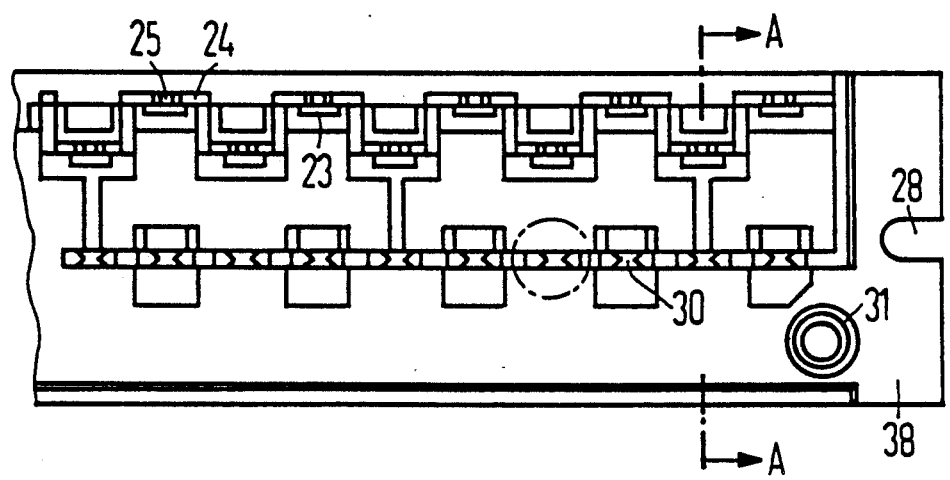
FIG. 5 is a fragmentary reduced-scale view of the underside of the sub-housing of the distributing strip of FIG. 1.

In FIG. 1, a main distributing strip 34 is illustrated as comprising a contact housing 1 and a sub-housing 2. In the same manner as further, identical strips, such a main distributing strip can be connected to a corresponding mounting rack, for example with fastening elements introduced into a notch 28 or, respectively, a male member 31 and guided therein. Contact elements 5 and 6 are inserted into the contact housing 1 that co-forms the distributing strip. The distribution of the contact elements 5 and 6 in the contact housing 1 is indicated in FIG. 2. These are respectively arranged in pairs immediately adjacent to one another, whereby two rows of such pairs of contact elements 5 and 6 offset relative to one another are formed. At the upper side which is to be used as the service side, the contact housing has openings 39 between the contact elements 5, 6 respectively allocated to one another, these contact openings 39 being for parting elements or, respectively, parting plugs 26, indicated by broken lines. The two rows of contact components allocated to one another in pairs extend offset relative to one another in the longitudinal direction of the distributing strip. The end regions 8 and 10 of the contact elements 5 and 6 that are conducted out of the contact housing 1 in the upper direction or, respectively, in the downward direction, are fashioned as cutting, insulation-piercing, insulation-disrupting clamps, so that a contact between this clamp element and the lead wire 12 or, respectively, 13 brought thereto is achieved without additional contacting measures by merely pressing the lead wire into the cutter. The lead wires 12 brought to the cutter clamps 10 of the contact 5 can, for example, be the lines leading to the subscribers in a communication system. Reconfigurations in the occupation of the distributor strip are more frequently required for such lines. Since these are connected to the service side 3, such changes can be carried out without problems For example, the line leads connected to the cutter clamps 10 of the contact elements 6 can produce the connection to the communication system. Since the occupation for these line leads is rarely changed, this fact is taken into consideration for the selection of the type of contact element. Compared with the contact element 5, the contact element 6 is designed significantly more simple. It may be seen from FIG. 4 that the contact element 5 is fashioned as what is referred to as a double blade clamp that is suitable for the connection of two line leads 12. This is advantageous particularly given modification work wherein the new connections must be capable of already being defined in preparatory fashion before the connections originally present are disconnected. The clamp element of the contact elements 5 suitable for frequent changes in the occupation therefore comprises two clamp slots lying side-by-side that are limited by two outer webs and by a middle web. For forming the webs, the band material employed for the contact element is bent back onto itself so that a corresponding stably-constructed cutter clamp 8 arises in this manner. It may be seen from FIG. 3 that the cutter clamp 10 of the contact element 6 is constructed in a significantly more simple manner in comparison thereto. As what is referred to as a simple clamp, it has only a single clamping slot and its thickness dimension merely corresponds to that of the band material employed. Such a contact element 6 can be manufactured in a significantly more cost-effective manner than the contact element 5 shown in FIG. 4.

The contact elements 5 or, respectively, 6 are inserted into receptacle chambers 35 or, respectively, 18 of the contact housing 1 and are held therein. The contact element 5 that extends essentially on a straight line to the rear side 4 of the distributing strip has a resiliently spread catch tab 9 at its rear end. The catch tab 9 engages behind a shoulder of the contact housing 1. The contact elements are provided with at least one contact pole 7 at that end facing toward the rear side 4.

The contact component 6 is held in a channel 19 of the contact housing 1. The contact elements 6 could be held with a bent interlock tab (not shown) that engages into a corresponding depression of the housing on the basis, for example, of the inherent tension of the contact element. In the proximity of the service side 3, the contact component 6 is bent back onto itself at an arcuate angle toward the rear side 4. A section 11 acts as a spring that likewise comprises a contact pole 7 at its free end, the contact pole 7 coming into contact with the corresponding, cooperating contact pole or poles of the other contact component 5. This contact location can be separated in that a parting plug 26 (indicated with broken lines) is inserted into the contact housing 1 in the direction indicated by an arrow. The parting plug 26 thereby strikes the obliquely-residing section 11 of the contact element 6 which is then press away from the cooperating contact pole 7 of the contact element 5. Overall, the contact elements 5 and 6 form an approximately Z-shaped structure. Given high contacting reliability, this enables an extremely small spacing between the sections of the contact elements 5 and 6 that extend approximately perpendicularly relative to the service side 3. The contact housing 1, accordingly, can be fashioned correspondingly narrow.

Two channel-like wiring spaces 15 and 16 that are separated from one another by a web 17 extending transversely relative to the outer wall of the housing 2 serve the purpose of bringing line leads in or, respectively, of bringing line leads out. In that the housing required for the arrangement of the contact elements 5 and 6 can be constructed particularly narrow as a consequence of the specific design of the contact elements 5 and 6, the wiring spaces 15 and 16 are to be accommodated in a distributing strip that is no wider than a strip known in the art and having an identical plurality of rows of contact components. The inner limitation of the wiring space 15 is formed by catch hooks 21 that, with the catch hooks 20 serve the purpose of fastening the contact housing 1 to the sub-housing 2 in a manner to be set forth in detail below. The lines to be conducted in the wiring space 15 represent the subscriber lines. The shoulders 14 serve the purpose of a certain pre-centering of the individual line leads that are introduced into the clamp elements 8 of a contact element 5. The wiring space 16 present for the line leads of the system side has its inside limited by a wall plate that belongs to the sub-housing 2 and to which a bottom plate 22 is provided for seating the contact housing 1. A strain relief at the distributing strip itself is provided for these system lines 13. For example, this can occur with the assistance of a pressure member 32 to be inserted that is, in turn, fixed by an existing tooth structure 33. In addition to the realization of the strain relief for the system lines in the form of the pressure member 32, the same can also be provided as an optional possibility for the attachment of a cable binder A pre-wiring of the system lines can therefore be undertaken in a factory in a simple manner.

Fastening holes for fastening the individual distributing strips to a mounting rack are provided For facilitating assembly, screw guides in the form of a male member 31 are provided, the male member 31 projecting into the wiring space 16 in the exemplary embodiment of FIG. 7. Given the multiple arrangement of such distributing strips that have end faces lying in a row, the male member 31 would constrict the wire guidance channel 16. Rated break points are therefore provided for the male members so that they can be very easily removed, as needed. As may be seen from FIG. 5, the notches 30 are provided for making the line leads guided in the wiring space 16 concentric. A line wire is then conducted by way of the notches 30 to the clamp elements 10 of the contact element 6 and pressed into the contact elements.

As already mentioned, the contact element 6 is more simply constructed than the contact element 5 for cost-saving reasons. In particular, the thickness of the clamp element 10 present at the one end of the contact element 5 corresponds only to the thickness of the material of the band employed for the contact element. In order to then be able to employ the same tool for pressing the line wires in for both types of clamp elements, i.e. for the clamp element of the contact element 5 and for the clamp element of the contact element 6, the clamp element 10 is supplemented, in thickness, to the thickness of the clamp element 8 of the contact component 5. This occurs in that a guide web 24 extending from the sub-housing 2 is provided immediately at the through opening for the clamp element 10. The thickness of the guide web 24 approximately corresponds to the difference between the thickness dimensions of the clamp element 10 and of the clamp element 8. The web 24 comprises a slot 25 so that the end of the line wire to be connected can be pressed into the clamp element 10 with the same tool and in the same manner as a line wire that is pressed into the clamp element 8 of the contact element 5. As FIG. 5 shows, the guide webs attached in front of the through openings for the clamp elements are joined to one another via corresponding cross webs in order to achieve the necessary stability so that a meander shape arises.

Figure 6:
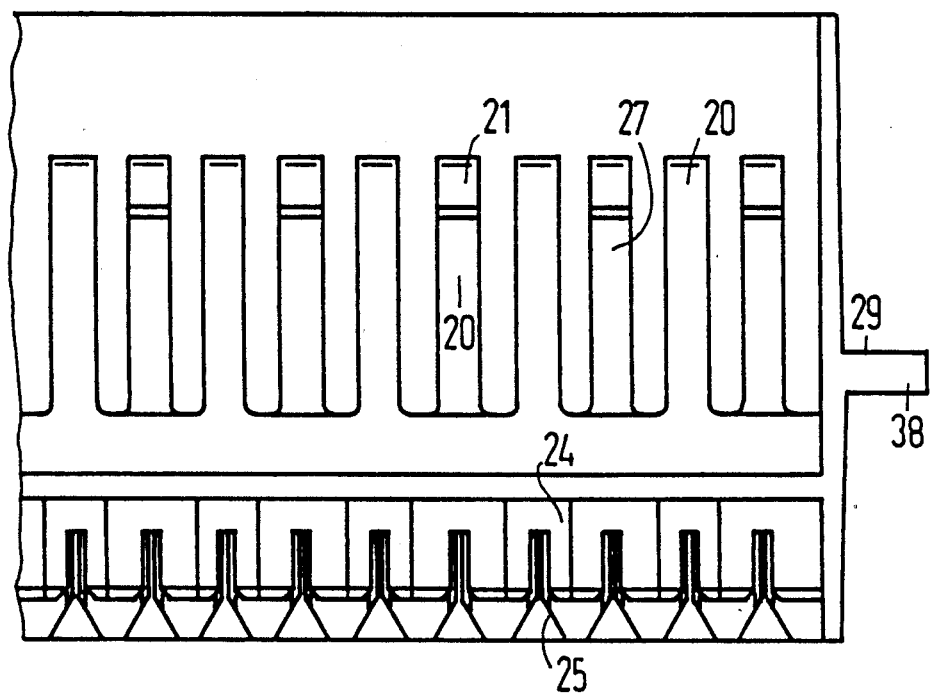
FIG. 6 is a fragmentary side view of a main distributor strip constructed in accordance with the present invention.

The arrangement of the webs and of the provided slot 25 may also be derived from the side view of FIG. 6. In the same manner as the cross-sectional view of FIG. 7, the catch hooks 21 or, respectively, 27 may be seen as being multiply provided over the longitudinal direction of the distributing strip at a respectively-defined distance from one another. When the contact housing 1 equipped with the contact elements is slipped on, the resilient catch noses 21 of the catch hooks 20, 27 are pressed laterally away and, after the contact housing is put in place on the bottom plate 22, engage behind the shoulders 37 of the contact housing 1. The clamp elements 10 of the contact elements 6 to be conducted out at the underside 4 are guided through the openings 23 of the bottom plate 22 when the contact housing 1 is pressed in and press against the web 24. After the attachment of the contact housing, the interspaces between the catch hooks 20, 27 are filled out by the corresponding, strip-like wall parts of the contact housing.

The main distributing strip 34 can be mounted on, for example, a swing-out frame together with other strips, so that the rear side 4 also remains conditionally accessible. The surface 29 of the shoulder 38 provided for fastening the distributing strip in a corresponding mounting rack can be provided with a labeling that marks the position of the individual contact components.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A main distributing strip, comprising:

an elongate contact housing including first wall means defining a first side, a second side and a plurality of chamber pairs including a first chamber and an adjacent second chamber and an open region defining a contact zone communicating said first and second chambers, said first chambers aligned in rows with alternate ones of said first chambers offset relative with respect to one another, each of said first chamber opening into said first side and each of said second chambers opening into said second side;

a plurality of first contact elements each mounted in a respective first chamber;

a plurality of cooperable second contact elements each mounted in a respective second chamber and paired with a respective first contact element;

each of said first and second contact elements comprising a first end region extending from the respective first and second chambers on said first and second sides, respectively, of said contact housing and each of said first end regions including an insulation-opening conductor clamp means for opening the insulation of and electrically-contacting the respective electrical conductor of an insulated electrical conductor, and each of said first and second contact elements comprising a second end region disposed to electrically contact the light end region of a cooperable contact element in the respective contact zone;

each of said second contact elements comprising a spring arm carrying the respective second end region and resiliently deflectable to open the connection;

a sub-housing including elongate second wall means spaced from said first wall means of said contact housing to define a channel-like wiring space, a transverse web extending transversely of said first and second wall means dividing said channel-like wiring space into first and second elongate troughs opening at and adjacent said first and second sides, respectively, for carrying insulated electrical conductors which are to be connected to said first end regions at said first and second sides.

2. The main distributing strip of claim 1, wherein:
said sub-housing includes a T-shaped section, including a cross member and a leg extending from said cross member to and substantially centrally of said contact housing as said web which divides said channel-like wiring space into said first and second elongate troughs.

3. The main distributing strip of claim 1, wherein:
said insulation-opening clamp means of each of said first contact elements comprises a clamp structure formed for individually receiving a respective one of a first predetermined number of insulating conductors; and
said insulation-opening clamp means of each of said second contact elements comprises a clamp structure formed for receiving one of a second, lesser predetermined number of insulated conductors.

4. The main distributing strip of claim 1, and further comprising:
at least one screw guide member in said second trough extending from said transverse web, each of said screw guide members including rated break points at its pointed connected to said transverse web.

5. The main distributing strip of claim 1, wherein:

said insulation-opening clamp means of each of said first contact elements comprises an alternating tooth and slot structure for repeated reception and separation of at least two insulated conductors individually in the slots; and
said second insulation-opening clamp means of each of said second contact elements comprises a pair of teeth separated by a slot for receiving an insulated conductor in said slot between said teeth of said pair of teeth.

6. The main distributing strip of claim 5, wherein:
said end regions of each of said first contact elements comprises a thickness which is greater than the thickness of said first end regions of each of said second contact elements; and
said contact housing comprises an elongate guide web extending from said second side immediately adjacent said first end regions of said second contact elements for supplementing the thickness of said first end regions of said second contact elements to equal that of said first end regions of said first contact elements so that all of said insulation-opening type connections may be made with the same conductor-insertion tool.

7. The main distributing strip of claim 6, wherein:
said guide web includes a plurality of slots therein, each of said slots aligned with a respective slot of said first end region of a respective second contact element for enabling the pressing of a respective insulated conductor into the respective end region slot.

8. The main distributing strip of claim 1, wherein:
each of said pairs of first and second contact elements form a Z-shaped contact structure, each of said first contact elements comprising an elongate member bent back upon itself to comprise a first section and a second section overlying said first section parallel thereto and therewith defining one cross member of the Z-shaped contact structure, said first section including a distal end and said first end region including the bend and adjacent portions of said first and second sections, said second section carrying said second end region;

each of said second contact elements comprising a first section and defining another cross member of the Z-shaped contact structure and including a first distal end portion carrying the respective first end region and a second distal end portion, and a spring arm extending at an angle with respect to said first section from a point adjacent said second distal end portion of said first section and defining the oblique member of the Z-shaped contact structure, said spring arm including said second end region contacting said second end region of said first contact element.

9. The main distributing strip of claim 7, wherein:
each of said second end regions of said first and second contact elements comprises at least one contact pole for contacting the like contact pole of the other contact element of the same pair of contact elements 10. The main distributing strip of claim 7, wherein:
each of said pairs of first and second contact elements are positioned such that said first end regions thereof exit said contact housing perpendicular to said first and second sides, respectively.

11. The main distributing strip of claim 8, wherein:

each of said first and second contact elements is a one-piece structure; and each of said spring arms of each of said second contact elements is punched from and bent from the respective first section.

12. The main distributing strip of claim 7, wherein:

each of said second chambers comprises a reentrant wall extending thereinto and forming a contact slot, said second distal end portion of the respective second contact element frictionally received in said contact slot.

13. The main distributing strip of claim 1, wherein insulated electrical conductors connected to said first end regions of said second contact elements extend thereto through and parallel to the surface of said second elongate trough, and further comprising:

a strain-relief member engaging in said second elongate trough to clamp the insulated electrical conductors and provide strain relief for the electrical connection.

14. The main distributing strip of claim 13, wherein:

said second elongate trough comprises toothed structures on the T-shaped section cross member and the contact housing for engaging and attaching said strain-relief member.

15. The main distributing strip of claim 1, wherein:

said sub-housing comprises third wall means offset and extending from and parallel to said web and forming a bottom wall for supporting said contact housing, catch elements extending from said third wall means; and said contact housing including ledge means engaged by said catch elements to secure said contact housing to said sub-housing.

16. The main distributing strip of claim 15, wherein:

said first wall means includes first and second walls having respective first and second outer surfaces, said second surface limiting said first trough, each of said outer surfaces including strip-shaped recesses therein, each of said first and second walls including shoulders in said recesses facing away from said third wall means; and said catch elements comprise a plurality of elongate resilient members and a hook carried by a distal end of each of said elongate resilient members, each of said hooks including a surface facing toward said third wall means for engaging a corresponding one of said shoulders, said elongate members received in respective ones of said recesses and including outer surfaces which lie coplanar with said outer surfaces of said first and second walls.

17. The main distributing strip of claim 15, wherein:

said catch elements further comprise a plurality of resilient catch hooks each including a catch nose comprising a first shoulder facing said third wall means and engaging said ledge means.

18. The main distributing strip of claim 17, wherein:

said ledge means and said catch noses each include a bevel surface for sliding bypassing engagement during snap-in connection of said contact housing to said sub-housing.

19. The main distributing strip of claim 18, wherein:

each of said catch hooks include an elongate member each carrying a respective catch nose and extending perpendicular to said third wall means, a first portion of said elongate members arranged in a first row and forming a portion of the outer surface of said distributing strip and a second portion of said elongate members spaced from said first portion and aligned in a second row and forming a part of the surface of said first trough.

20. A main distributing strip, comprising:

a first elongate housing part including first, second, third and fourth spaced elongate walls, a plurality of pairs of contact locations arranged in longitudinal rows, and a fifth elongate wall connecting said first, second, third and fourth elongate walls and including a plurality of openings therethrough, each of said openings communicating a respective contact location with the exterior of the main distributing strip, each of said first, second, third and fourth walls including an edge spaced from said fifth elongate wall;

each of said pairs of contact locations including a first contact location and a second contact location;

a plurality of first contacts each located between said first and second walls and each including a first section, a second section overlying said first section, and a bend connecting said first and second sections, said bend and portions of said first and second sections immediately adjacent thereto extending through a respective opening in said fifth elongate wall and including insulation-opening contact means for disrupting the insulation of at least one insulated electrical conductor pressed therein and contacting the electrical conductor, said first section including a first distal end facing away from said fifth elongate wall and said second section including a second distal end, at least one contact hole carried on said second distal end, and a tab facing said first distal end;

said first wall including a projection which includes oppositely-facing surfaces respectively engaging said first distal end and said tab of each of said first contacts;

a plurality of second contacts each including a first section located against said third wall and including first and second distal ends, and a second section struck out from and joined to and extending at an angle to said first section at a point spaced from said first distal end, said second section including a third distal end and at least one contact pole carried on said third distal end and engaging at least one contact pole of the respective first contact at a point below said edge of said second wall;

said third wall comprising a turned-back projecting section extending parallel to and spaced from said third wall immediately adjacent the respective opening through said fifth elongate wall, said first distal end held in said space between said third wall and said projecting section;

a second housing part comprising a fifth wall, a sixth wall extending perpendicular from said fifth wall and supporting said edge of said first wall spaced from said fifth wall to define a first wiring trough, a seventh wall aligned with said first wall spaced from said fifth wall and defining a second wiring trough, an eighth wall extending perpendicular from said seventh wall to form a bottom for said first housing part, said eighth wall including a plurality of openings therethrough communicating said second contact locations with the exterior of said main distributing strip;

said second distal end of each of said first sections of each of said second contacts extending through a respective opening through said eighth wall and comprising insulation-opening contact means for disrupting the insulation of a respective insulated electrical conductor press therein and contacting the electrical conductor thereof;

ledge means extending perpendicular from said third wall including a surface facing said fifth wall; and
resilient hook means extending perpendicular from said eighth wall for engaging behind said ledge means and against said surface to hold together said first and second housing parts.

* * * * *